(12) United States Patent
Cintas et al.

(10) Patent No.: US 11,048,741 B2
(45) Date of Patent: Jun. 29, 2021

(54) BIAS DETECTION AND ESTIMATION UNDER TECHNICAL PORTFOLIO REVIEWS

(71) Applicant: International Business Machines Corporation, Armonk, NY (US)

(72) Inventors: Celia Cintas, Nairobi (KE); William Ogallo, Nairobi (KE); Aisha Walcott, Nairobi (KE); Sekou Lionel Remy, Nairobi (KE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 218 days.

(21) Appl. No.: 16/399,184

(22) Filed: Apr. 30, 2019

(65) Prior Publication Data
US 2020/0349182 A1 Nov. 5, 2020

(51) Int. Cl.
*G06F 16/335* (2019.01)
*G06F 16/34* (2019.01)
*G06F 16/35* (2019.01)
*G06N 5/04* (2006.01)
*G06F 40/216* (2020.01)
*G06F 40/284* (2020.01)

(52) U.S. Cl.
CPC .......... *G06F 16/345* (2019.01); *G06F 16/335* (2019.01); *G06F 16/355* (2019.01); *G06F 40/216* (2020.01); *G06F 40/284* (2020.01); *G06N 5/04* (2013.01)

(58) Field of Classification Search
CPC .. G06F 16/3347; G06F 16/335; G06F 16/345; G06F 16/9536; G06F 40/30; G06N 20/00; G06N 7/005
See application file for complete search history.

(56) References Cited

U.S. PATENT DOCUMENTS

| | | | |
|---|---|---|---|
| 7,519,562 B1 * | 4/2009 | Vander Mey | G06Q 30/02 705/12 |
| 9,652,745 B2 | 5/2017 | Taylor et al. | |
| 2010/0274791 A1 | 10/2010 | Chow et al. | |
| 2012/0197816 A1 * | 8/2012 | Short | G06Q 30/0282 705/347 |
| 2015/0371191 A1 | 12/2015 | Taylor et al. | |

(Continued)

OTHER PUBLICATIONS

Mel, et al. "The NIST Definition of Cloud Computing". Recommendations of the National Institute of Standards and Technology. Nov. 16, 2015.

(Continued)

*Primary Examiner* — Olujimi A Adesanya
(74) *Attorney, Agent, or Firm* — Shimon Benjamin, Esq; McGinn I.P. Law Group, PLLC.

(57) ABSTRACT

A bias detection method, system, and computer program product include creating a context of an applicant based on a profile of the applicant and a context of a reviewer based on a profile of the reviewer, predicting a probability of overlapping data points between the applicant and the reviewer, building enriched embeddings for a deep learning model based on the context of the applicant, the context of the reviewer, the overlapping data points, and text from a review and a final decision by the reviewer, and calculating a bias score via a deep learning model run over the enriched embeddings.

17 Claims, 7 Drawing Sheets

(56) References Cited

U.S. PATENT DOCUMENTS

| | | |
|---|---|---|
| 2016/0055457 A1 | 2/2016 | Mather et al. |
| 2017/0116873 A1 | 4/2017 | Lendvay et al. |
| 2017/0132309 A1* | 5/2017 | Bufe, III ................ G06N 5/022 |
| 2017/0330058 A1 | 11/2017 | Silberman et al. |
| 2019/0369837 A1* | 12/2019 | Davis ....................... G09B 5/06 |
| 2020/0233910 A1* | 7/2020 | Bhide ..................... G06F 40/40 |
| 2020/0394265 A1* | 12/2020 | Ray ....................... G06F 40/226 |

OTHER PUBLICATIONS

Mueller KF, Meerpohl JJ, Briel M, et al. Detecting, quantifying and adjusting for publication bias in meta-analyses: protocol of a systematic review on methods. Syst Rev. 2013; 2:60. Published Jul. 25, 2013. doi:10.1186/2046-4053-2-60.

* cited by examiner

BIAS DETECTION AND ESTIMATION UNDER TECHNICAL PORTFOLIO REVIEWS

BACKGROUND

The present invention relates generally to a bias detection method, and more particularly, but not by way of limitation, to a system, method, and computer program product for methodology and class bias detection and estimation under technical portfolio reviews.

Research shows that peer review can suffer from implicit bias just like hiring processes that may disadvantage particular classes of individuals.

Several attempts have been made to mitigate bias in peer review. In single-blind peer review, the reviewers' identities are kept anonymous, but the reviewers are aware of the names and affiliations of the authors. The reviewers can analyze the authors' submissions without influence or fear of reprisals from the authors. This approach may not, however, protect the authors from any forms of social biases. In double-blind peer reviews, both authors and reviews are anonymous. This ensures fairness to authors but may not guarantee full protection from bias. It should be noted that even if the authors and reviewers are anonymous, particularly in small scientific communities, it may be easy for reviewers to identify the authors based on topics, methodologies, and references available in submissions for review.

There is also research attesting to higher quality of reviews in open (signed) peer reviews compared to anonymous reviews. In such reviews, authors and reviewers know each other's identities, and it is believed that such transparency would promote review accountability and impartiality, as well as provide a means of contextualizing the content of reviews with domain knowledge and perspectives from which reviews are written.

However, regardless of measures put in place to mitigate biases, human beings by nature are biased, yet most of the time one never knows that we are being biased. Fortunately, when one is on the lookout for biases, they are less likely to blindly dictate our decisions. As a result, the inventors have identified that it is critical to develop innovative ways for detecting potential biases in portfolio reviews. This information can be used by those in position to make responsible interventions such as meta-reviewers in scientific committees for conferences or editorial boards for journals, and human resource managers.

SUMMARY

In an exemplary embodiment, the present invention provides a computer-implemented bias detection method for generating a contextual measurement of class and methodological bias in a review processes, the method including creating a context of an applicant based on a profile of the applicant and a context of a reviewer based on a profile of the reviewer, predicting a probability of overlapping data points between the applicant and the reviewer, building enriched embeddings for a deep learning model based on the context of the applicant, the context of the reviewer, the overlapping data points, and text from a review and a final decision by the reviewer, and calculating a bias score via a deep learning model run over the enriched embeddings.

One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

The invention will now be described with reference to FIGS. 1-7, in which like reference numerals refer to like parts throughout. It is emphasized that, according to common practice, the various features of the drawings are not necessarily to scale. On the contrary, the dimensions of the various features can be arbitrarily expanded or reduced for clarity.

Figure 1:
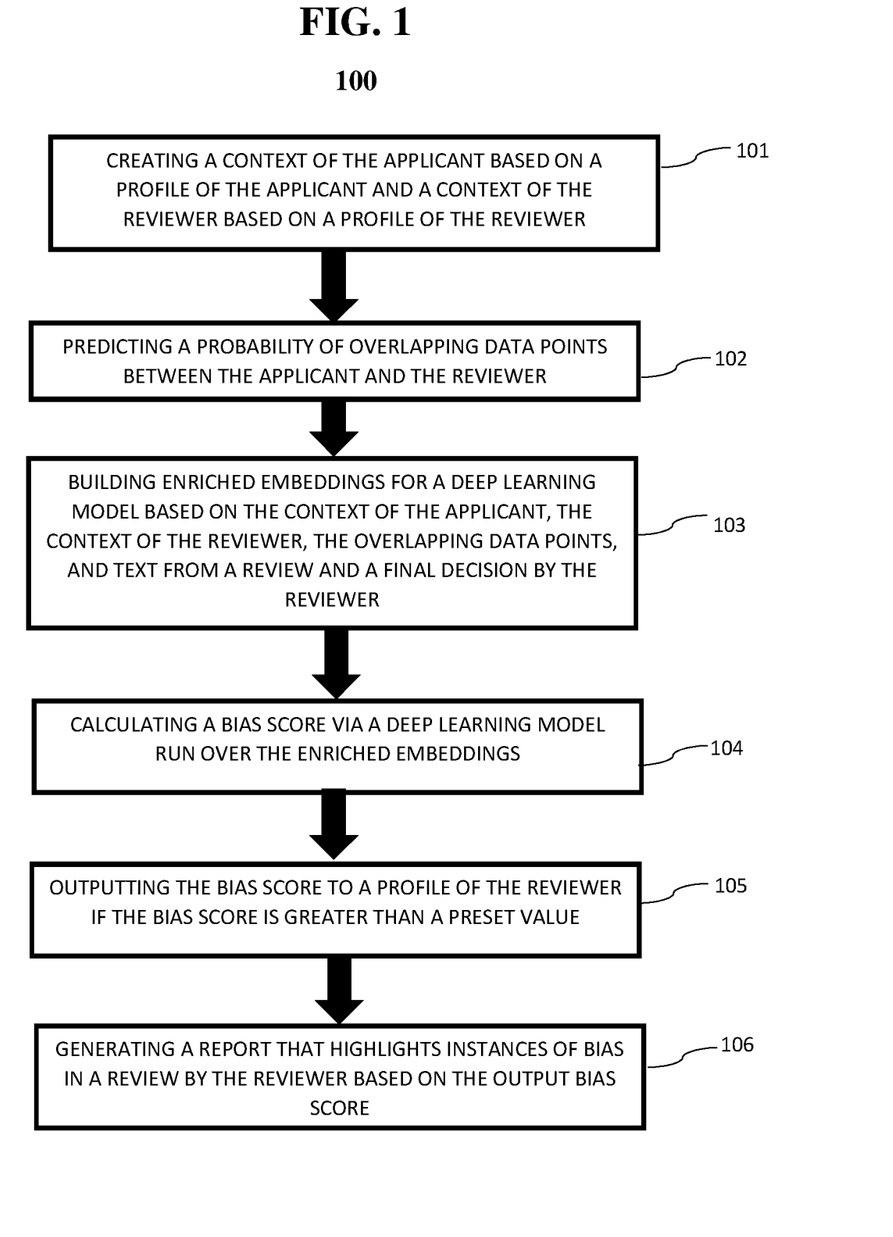
FIG. 1 exemplarily shows a high-level flow chart for a bias detection method 100 according to an embodiment of the present invention.

By way of introduction of the example depicted in FIG. 1, an embodiment of a bias detection method 100 according to the present invention can include various steps for automatically inferring methodological and class bias in portfolio reviews.

Figure 5:
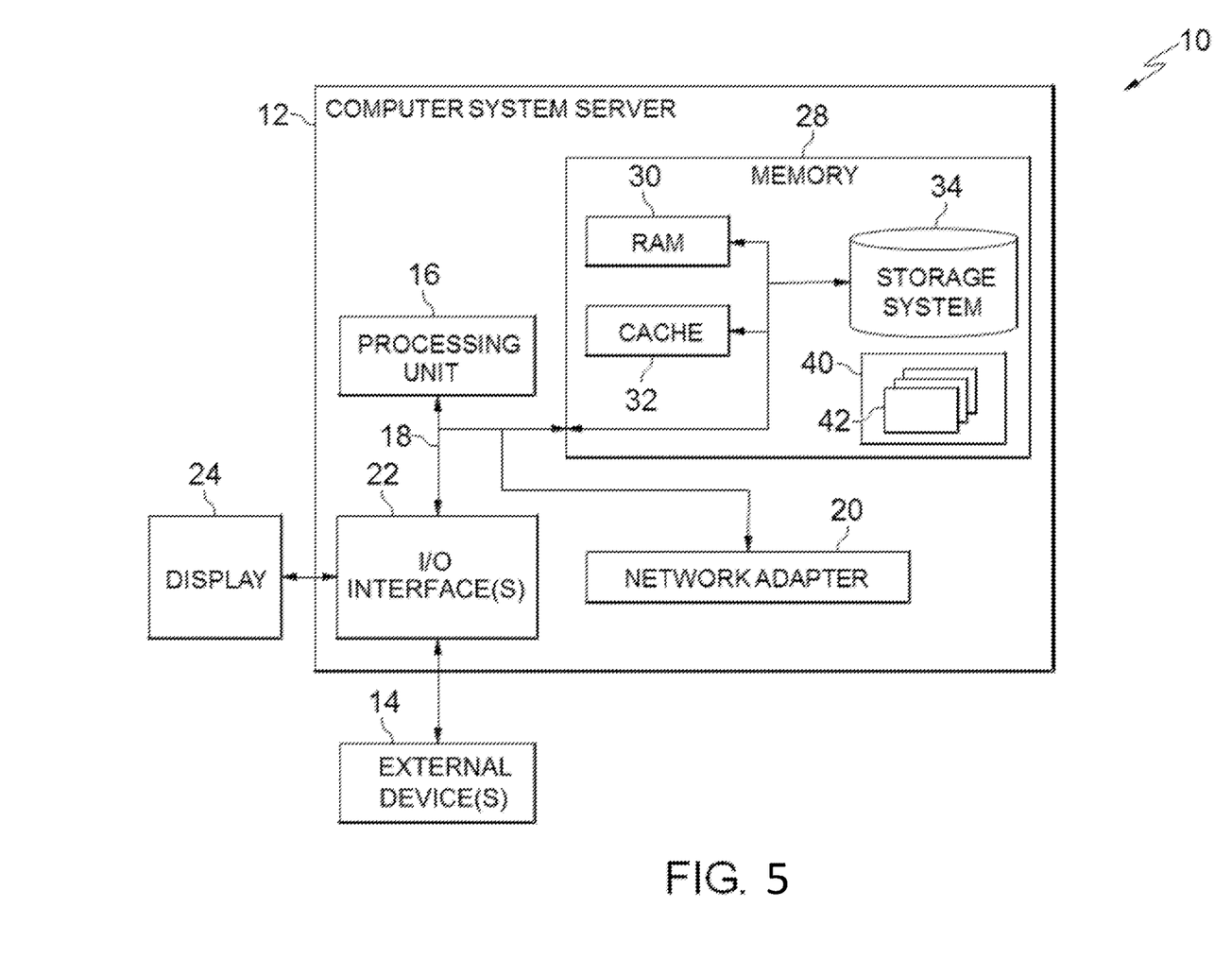
FIG. 5 depicts a cloud-computing node 10 according to an embodiment of the present invention.

By way of introduction of the example depicted in FIG. 5, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 7), it is nonetheless understood that the present invention can be implemented outside of the cloud environment.

With reference generally to method 100, method 100 generates contextual measurement of class and methodological bias in review processes (e.g., hiring, promotion, publications, etc.) by taking into account the review source (e.g., free text and reviewer's decision), the reviewer profile information (e.g., publications in the last X years, current and previous position, affiliations, dissertations, technologies, social networks profile, etc.), and the applicant information. The method 100 creates a rich embedding with the previously mentioned context information and calculates a methodological and class bias score.

The method 100 includes analyzing methodological bias associated with context of the reviewer and the applicant. The method 100 correlates that reviewer X has worked on methodologies Z for the last Y years.

Figure 3:
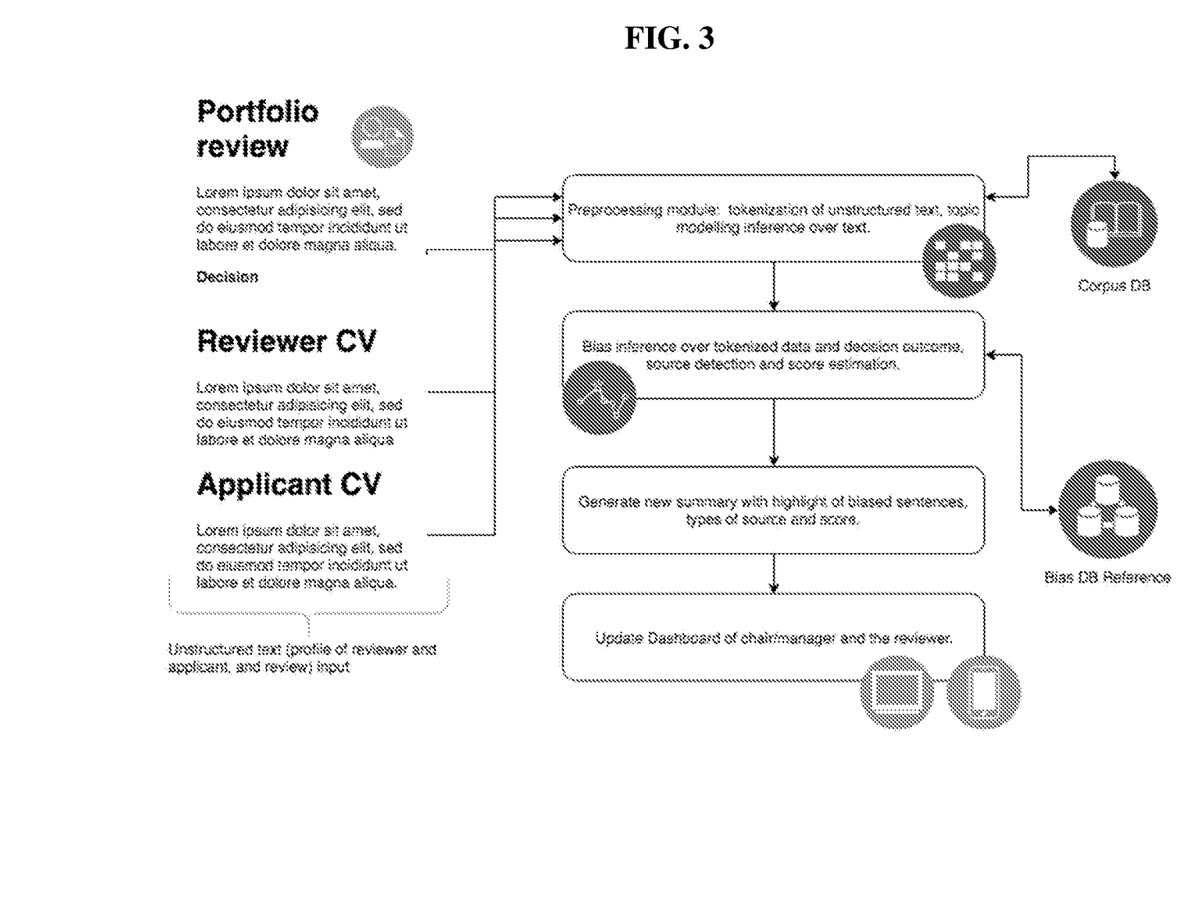
FIGS. 3-4 exemplarily depict flows for bias review according to an embodiment of the present invention.
Figure 4:
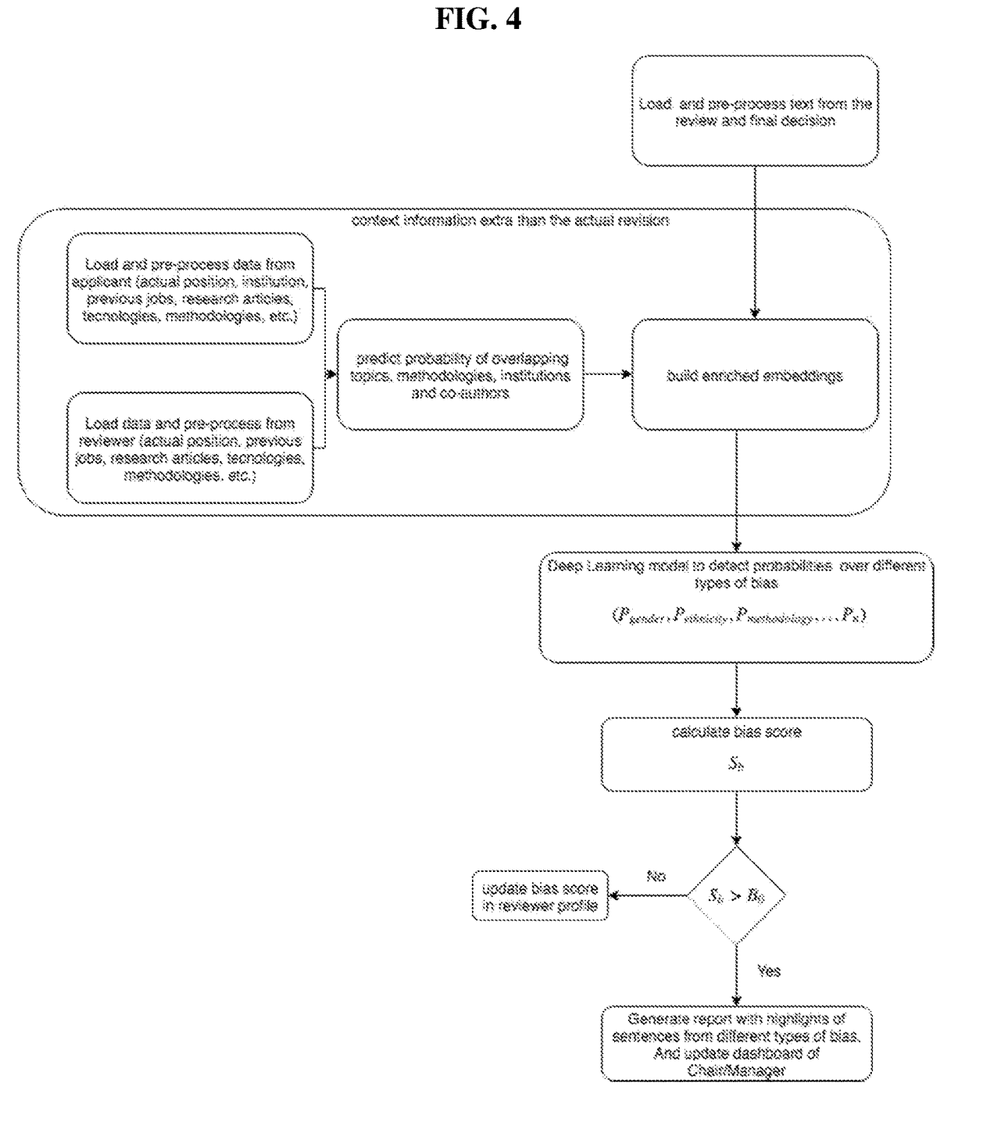

With reference to FIGS. 1 and 3-4, in step 101, a context of the applicant based on a profile of the applicant, and a context of the reviewer, based on a profile of the reviewer are created. For example, data is loaded and pre-processed that may include demographic information, a position being applied for, prior jobs, research articles, technological proficiencies, methodologies, etc. to create the context. Indeed, the context of both of the reviewer and applicant is created not only to identify demographic information (i.e., gender, race, age, etc.), but also create a more holistic outlook of each based on other aspects such as where they attended school, etc.

It is noted that "position-related parameters" include all variables related to merit-based credentials such as prior jobs, research articles, etc.

In step 102, a probability of overlapping data points between the applicant and the reviewer is predicted. Here, the data used in step 101 is analyzed to determine where the applicant and reviewer may overlap. For example, it is determined if there are any overlapping co-authors that both have worked with, institutions attended, methodology, etc. That is, overlapping parameters can induce a bias and are therefore determined.

In step 103, enriched embeddings (i.e., mapping the data in vector form) for a deep learning model based on the context of the applicant, the context of the reviewer, the overlapping data points, and text from a review and a final decision by the reviewer, is built.

In step 104, a bias score is calculated via the deep learning model run over the enriched embeddings.

In step 105, the bias score is output to a profile of the reviewer if the bias score is greater than a preset value. For example, a client can set a particular bias score for a particular type of bias (i.e., bias against age) greater than a different type of bias (i.e., bias against methodologies) if the client wants to correct a bias against a particular type of group more than against another. In other words, the client can set the bias score lower (i.e., threshold of bias is lower) for different types of bias to trigger flags in the profile of the reviewer.

In step 106, a report is generated that highlights instances of bias in a review by the reviewer based on the output bias score. That is, sentences in the text from the review and the final decision by the reviewer from step 103 are annotated and highlighted such that instances of bias can be shown to the reviewer. In other words, a reviewer can be trained to reduce or fix their bias based on the annotated and/or highlighted text from their review.

Thus, method 100 provides a technique for estimating bias (i.e., establishes the source and calculate score) in review processes by, for example, providing an electronic device loaded with a software application and/or accessing a remote application, and by the electronic device.

The method includes a bias engine that generates a report of a paper or work application review using context information about the author of the review (institution, job, papers published, methodologies, etc.), and highlights of possible conflicts or implicit bias (such as the academic institution of the author or previous place of employment, or any other affiliations that could affect their portfolio reviews.

The sources of the bias can include, for example, gender, ethnicity, academic affiliation, project alignment, methodology responses, ecological fallacy, etc.

The bias score is the proportion on how much biased the decision is made in the review and weighted with company/journal diversity policy (from '0' to '1', '0' lowest biased decision to '1' highest bias decision score).

The invention makes methodological and minority bias visible to chairs or managers. A tool that enables the reviewer introspection in how the decisions are made, giving a company/journal/conference more transparency and fairness on how the hiring/promotion process/paper review is done.

Figure 2:
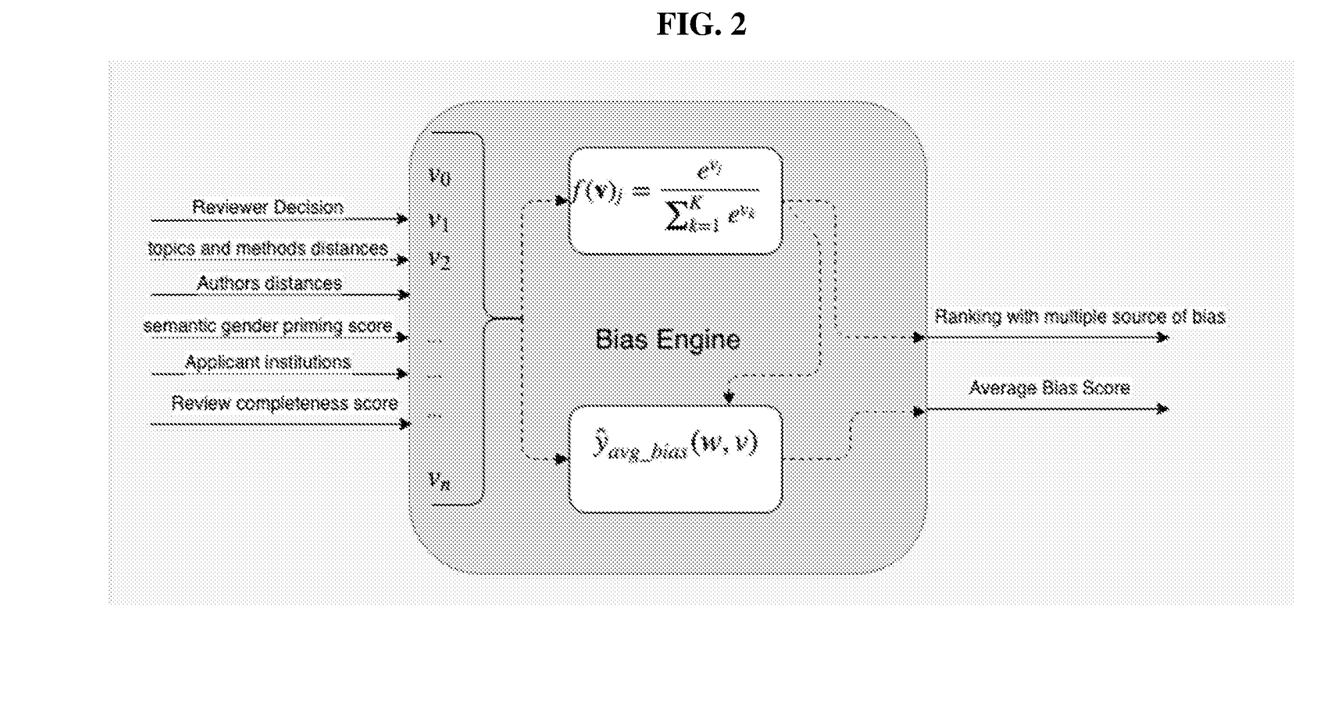
FIG. 2 exemplarily depicts a bias detection engine according to an embodiment of the present invention.

In an exemplary working embodiment with reference to FIGS. 2-4, the method can run on a mobile or a desktop device. The manager submits an applicant's resume in, for example, .pdf format and cover letter for the job to the method. Also, the manager assigns reviewer X and Y for the hiring process review.

The system creates a context $C_x$ and $C_y$ with relevant information about the reviewers profile extracted from the System Profile database (DB), social networks (i.e., key topics and sentiment associated to them can be extracted from social networks) and an updated resume. In one embodiment, the context $C_x$ (or $C_y$)={methodologies: Support Vector Machine "SVM", 'Linear regression', technologies: 'Python', 'R', papers: 'examples', institutions: 'Harvard, 'ESA', collaborators:}. The system also creates a context $C_{applicant}$ with the same structure.

The method tokenizes the free text corresponding to a review of the applicant by the reviewer using natural language processing (NLP) tools such that review$_x$={'The applicant demonstrates proficiency in multiple state of the art methods, such as SVM, and Linear Regression. I recommend this person for the position X'} and creates an enriched vector $Vi=\{t0, t1, \ldots, t_n, C_x, C_{applicant}\}$ with the tokens from the review. The Vi is used as an input to an already trained recurrent network (for example, a "Long Short Term Memory" LSTM network). The LSTM predicts the probability of methodological bias between [0, 1] (i.e., the LSTM is trained with averaged binary cross entropy per sentence) and the subsequence of tokens with highest individual token probability such as $t_i$={'proficiency', 'SVM', 'Linear Regression'} and context information (elements inside $C_x$, $C_{applicant}$) responsible for the bias score.

The overall bias score can be a linear regression with a fixed weight parameter corresponding to a company policy $P_j$={appearance of methodology bias is penalized with 0.7 due to the company looking to diversify technologies}. The method generates a new report with highlights of biased sentences, types of source, score, etc.

The method sends a notification with new data to a Dashboard of a manager and recommends to the manager other reviewer Z with a lower bias score towards these methodologies. In one embodiment, in the Chair Dashboard application shown in FIG. 3, a bias group can be calculated, with usually the reviews being made by a set of evaluators, so that a bias group score can be estimated, for future automatic grouping algorithms of reviewers.

The invention includes a new inventive technique for automatically detecting gender, minority, methodological bias, ecological fallacy, reviewer implicit bias based on reviewer and applicant's context and text in portfolio review processes, thereby encouraging more transparency and fairness in hiring/promotion process/paper reviews. That is, the invention includes submitting a review text/summary and decision by a reviewer/evaluator for an applicant X (with curriculum vitae (CV), cover letter), creating a context with relevant information corresponding to the review text, the applicant's profile information/CV, and the reviewer's profile information, review description and review decision and tokenizing unstructured text corresponding to the review text using natural language processing (NLP) tools, estimating the type of bias source in each sentence of the review text/summary and calculating the bias score in response to determining the type of bias source given the decision made by the reviewer and generating a new report/summary which highlights biased sentences of the review, types of sources and score, and sending a notification with new data to dashboard of the manager and recommending other reviewers with a lower bias score to the manager.

Referring to FIG. 2, FIG. 2 shows the module of the bias prediction module. First, a normalized exponential function is implemented to assign a probability to a type of source bias to occurs using V as the vector with features corresponding to the analyzed text (topics, similarity, sentiment, graph distances, etc.), the output of this function is a K-dimensional vector (K will be the number of sources of bias) with values between (0, 1), all the entries add 1. So, we will keep the highest value as the corresponding class of bias. (The sources of the bias can be gender, ethnicity, academic affiliation, project alignment, pattern-recognition responses, ecological fallacy, etc.) Second, a function that calculates the overall bias score. The function can be a linear regression with a fixed weight parameter corresponding to a company policy $P_j$.

In one embodiment, different types of bias and sensibility to them can be targeted by setting a value of $B_o$ lower such even a small indication of bias can be flagged as shown in FIG. 4. The FIG. 4 shows the steps followed to generate the bias score and report to a manager/chair. First, the preprocessing step is in charge of clean and prepare data from the review and the decision. A second step is creating the context information from applicant and reviewer, adding extra information to the method that just the review text and decision. During these steps the enriched embeddings are created to use them as input in the Deep learning model. The output of this function is a K-dimensional vector (K will be the number of sources of bias) with values between (0, 1), all the entries add 1. So, we will keep the highest value as the corresponding class of bias. Furthermore, an overall bias score is calculated, the score is measured against a threshold defined by the company/journal/conference. If the bias score crosses the threshold ($B_0$) a summary of the biased sentences encountered in the review and highlights about the different types of bias founded is send it to the Chair/Manager using a dashboard.

Further, it is noted that an output of the invention may include both a bias score and a highlighted version of the review documents by the reviewer such that the reviewer can be trained and shown bias.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 5, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 6:
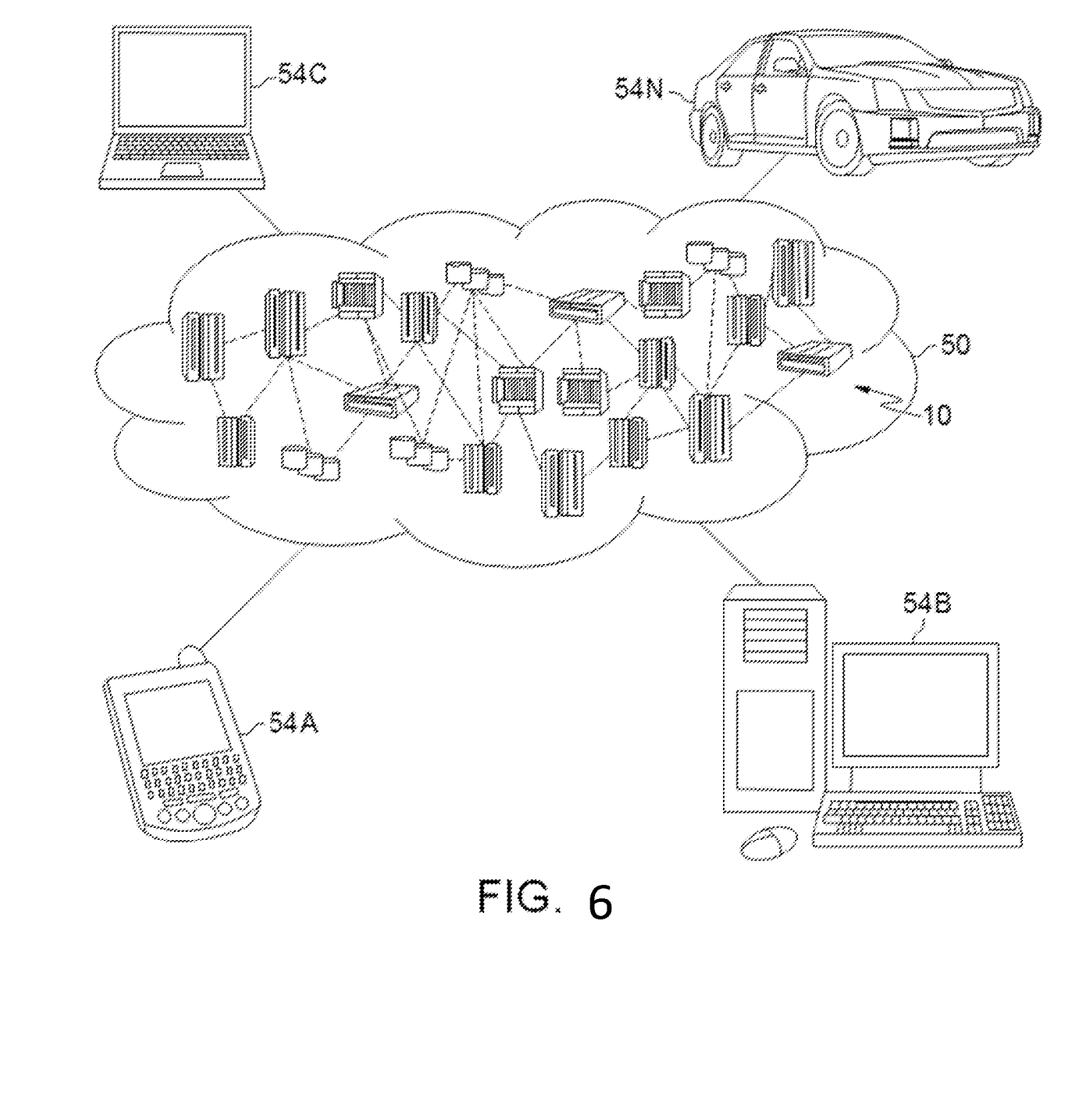
FIG. 6 depicts a cloud-computing environment 50 according to an embodiment of the present invention.

Referring now to FIG. 6, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 6 are intended to be illustrative only and that computing nodes 10 and cloud computing environment 50 can communicate with any type of computerized circuit over any type of network and/or network addressable connection (e.g., using a web browser).

Figure 7:
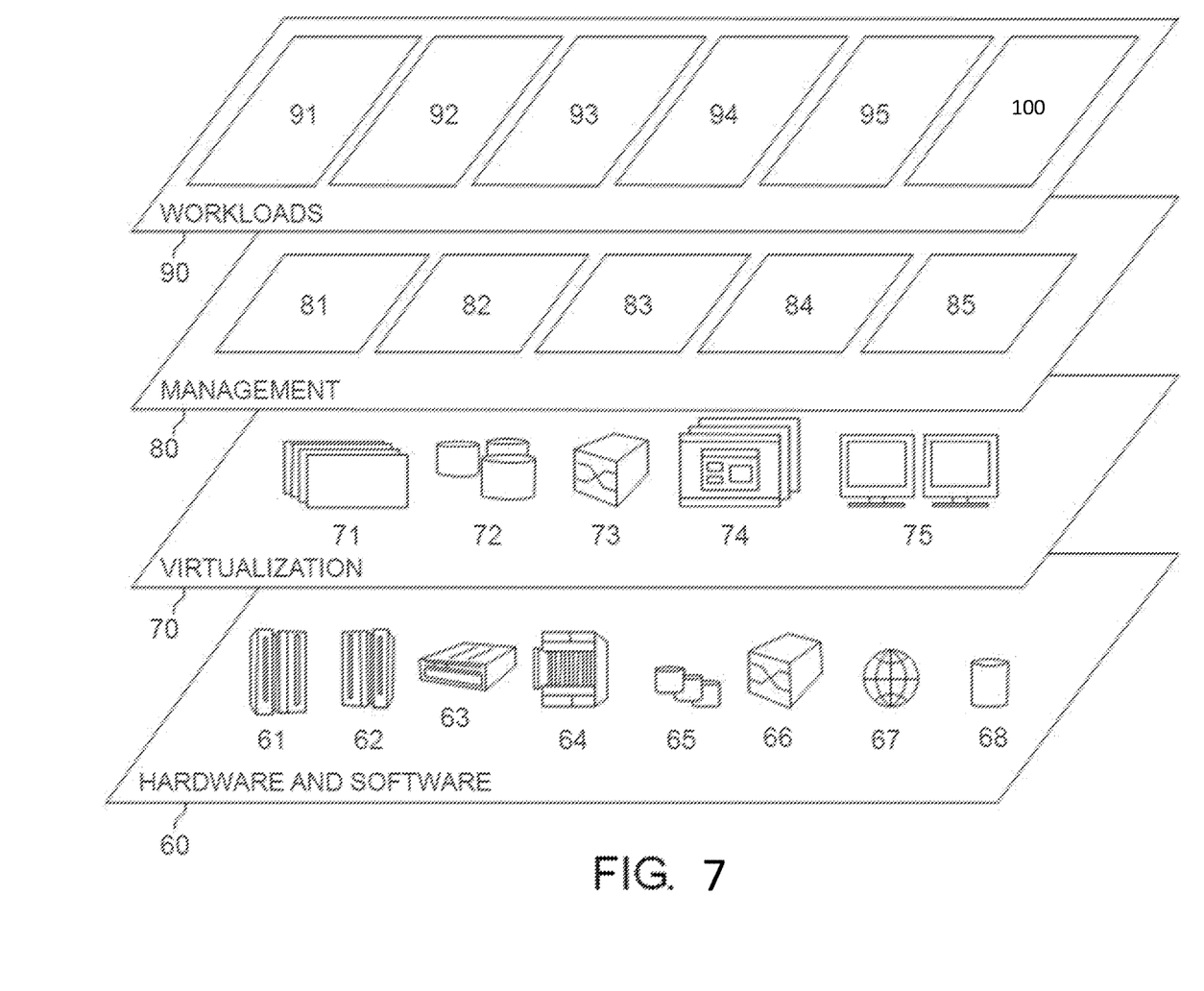
FIG. 7 depicts abstraction model layers according to an embodiment of the present invention.

Referring now to FIG. 7, an exemplary set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and bias detection method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented bias detection method for generating a contextual measurement of class and methodological bias in a review processes, the method comprising:
    creating a context of an applicant based on a profile of the applicant and a context of a reviewer based on a profile of the reviewer;
    predicting a probability of overlapping data points between the applicant and the reviewer;
    building enriched embeddings for a deep learning model based on the context of the applicant, the context of the reviewer, the overlapping data points, and text from a review and a final decision by the reviewer; and
    calculating a bias score via the deep learning model run over the enriched embeddings,
    wherein the bias score includes a combination of:
        a class bias;
        a methodological bias;
        an ecological fallacy;
        a reviewer bias;
        a reviewer variation; and
        an implicit bias.

2. The method of claim 1, further comprising outputting the bias score to a profile of the reviewer if the bias score is greater than a preset value.

3. The method of claim 1, further comprising generating a report that highlights instances of bias in the review by the reviewer based on the bias score.

4. The method of claim 2, further comprising generating a report that highlights instances of bias in the review by the reviewer based on the output bias score.

5. The method of claim 1, wherein the bias score includes a combination of:
    a class bias; and
    a position related parameter.

6. The method of claim 1, embodied in a cloud-computing environment.

7. A computer program product for bias detection, the computer program product comprising a computer-readable storage medium having program instructions embodied therewith for generating a contextual measurement of class and methodological bias in a review processes, the program instructions executable by a computer to cause the computer to perform:
    creating a context of an applicant based on a profile of the applicant and a context of a reviewer based on a profile of the reviewer;
    predicting a probability of overlapping data points between the applicant and the reviewer;

building enriched embeddings for a deep learning model based on the context of the applicant, the context of the reviewer, the overlapping data points, and text from a review and a final decision by the reviewer; and calculating a bias score via the deep learning model run over the enriched embeddings, wherein the bias score includes a combination of:
- a class bias;
- a methodological bias;
- an ecological fallacy;
- a reviewer bias;
- a reviewer variation; and
- an implicit bias.

8. The computer program product of claim 7, further comprising outputting the bias score to a profile of the reviewer if the bias score is greater than a preset value.

9. The computer program product of claim 7, further comprising generating a report that highlights instances of bias in the review by the reviewer based on the bias score.

10. The computer program product of claim 8, further comprising generating a report that highlights instances of bias in the review by the reviewer based on the output bias score.

11. The computer program product of claim 7, wherein the bias score includes a combination of:
- a class bias; and
- a position related parameter.

12. A bias detection system for generating a contextual measurement of class and methodological bias in a review processes, the system comprising:
- a processor; and
- a memory, the memory storing instructions to cause the processor to perform:
    creating a context of an applicant based on a profile of the applicant and a context of a reviewer based on a profile of the reviewer;
    predicting a probability of overlapping data points between the applicant and the reviewer;
    building enriched embeddings for a deep learning model based on the context of the applicant, the context of the reviewer, the overlapping data points, and text from a review and a final decision by the reviewer; and
    calculating a bias score via the deep learning model run over the enriched embeddings,
    wherein the bias score includes a combination of:
    - a class bias;
    - a methodological bias;
    - an ecological fallacy;
    - a reviewer bias;
    - a reviewer variation; and
    - an implicit bias.

13. The system of claim 12, further comprising outputting the bias score to a profile of the reviewer if the bias score is greater than a preset value.

14. The system of claim 12, further comprising generating a report that highlights instances of bias in the review by the reviewer based on the bias score.

15. The system of claim 13, further comprising generating a report that highlights instances of bias in the review by the reviewer based on the output bias score.

16. The system of claim 12, wherein the bias score includes a combination of:
- a class bias; and
- a position related parameter.

17. The system of claim 12, embodied in a cloud-computing environment.

* * * * *